United States Patent
Miyake et al.

(10) Patent No.: US 11,388,024 B2
(45) Date of Patent: Jul. 12, 2022

(54) COMMUNICATION NETWORK SYSTEM

(71) Applicant: YAMAHA HATSUDOKI KABUSHIKI KAISHA, Iwata (JP)

(72) Inventors: Yasushi Miyake, Shizuoka (JP); Yasuhiro Kaneko, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 239 days.

(21) Appl. No.: 16/758,377

(22) PCT Filed: Nov. 13, 2017

(86) PCT No.: PCT/JP2017/040686
§ 371 (c)(1),
(2) Date: Apr. 22, 2020

(87) PCT Pub. No.: WO2019/092873
PCT Pub. Date: May 16, 2019

(65) Prior Publication Data
US 2020/0344091 A1 Oct. 29, 2020

(51) Int. Cl.
*H04L 12/66* (2006.01)
*H04L 9/40* (2022.01)
(Continued)

(52) U.S. Cl.
CPC .......... *H04L 12/66* (2013.01); *H04L 63/0884* (2013.01); *H04L 67/14* (2013.01); *H04L 69/22* (2013.01)

(58) Field of Classification Search
None
See application file for complete search history.

(56) References Cited

U.S. PATENT DOCUMENTS

2004/0125801 A1 7/2004 Nawata
2009/0205031 A1 8/2009 Sato et al.
(Continued)

FOREIGN PATENT DOCUMENTS

CN 101107612 A 1/2008
JP 2004-120534 A 4/2004
(Continued)

OTHER PUBLICATIONS

An Office Action mailed by China National Intellectual Property Administration dated Aug. 20, 2021, which corresponds to Chinese Patent Application No. 201780096655.5 and is related to U.S. Appl. No. 16/758,377 with English language translation.
(Continued)

*Primary Examiner* — Phirin Sam
(74) *Attorney, Agent, or Firm* — Studebaker & Brackett PC

(57) ABSTRACT

A communication network system includes a cloud server device connectable with an external device via a global network, and a gateway device. The gateway device includes a first communication section which communicates with the cloud server device via the global network; a second communication section which communicates with an internal device via a local area network; first and second communication controlling sections which respectively control the first and second communication sections; and a communication history storage section. After establishment of a session between the external device and the internal device under the control of the first and second communication sections by the first and second communication controlling sections, the communication history storage section stores communication history information about a history of the communication between the external device and the internal device.

15 Claims, 15 Drawing Sheets

(51) Int. Cl.
    *H04L 67/14*    (2022.01)
    *H04L 69/22*    (2022.01)

(56)         References Cited

U.S. PATENT DOCUMENTS

2011/0314145 A1*   12/2011   Raleigh ................ H04W 48/16
                                                            709/224
2012/0265976 A1    10/2012   Spiers et al.
2012/0307659 A1*   12/2012   Yamada ................. H04L 12/66
                                                            370/252
2014/0303934 A1*   10/2014   Mylarappa .......... G06F 11/3089
                                                            702/186
2016/0226732 A1*    8/2016   Kim ................. H04W 12/0431
2017/0005829 A1     1/2017   Kouno
2018/0020027 A1*    1/2018   Chen ................. H04L 65/1006
2018/0048655 A1*    2/2018   Zetterlund ............. H04L 67/16
2018/0124094 A1*    5/2018   Hamdi ................. G06F 21/552
2021/0076966 A1*    3/2021   Grantcharov .......... G06N 20/00

FOREIGN PATENT DOCUMENTS

JP          2004-310295 A      11/2004
JP          2007-006109 A       1/2007
JP          2017-016422 A       1/2017
JP          2017-118484 A       6/2017

OTHER PUBLICATIONS

International Search Report issued in PCT/JP2017/040686; dated Feb. 6, 2018.

* cited by examiner

FIG.8

| SESSION START DATE AND TIME (JH11) | IP ADDRESS OF ACCESS DEMANDING SOURCE (GAM) | ID OF ACCESS DEMANDING SOURCE (MGID) | IP ADDRESS OF ACCESS DESTINATION (LAM) | ID OF ACCESS DESTINATION (MID) | COMMUNICATION CONTENT (JH12) |
|---|---|---|---|---|---|
| S001 | A1.B1.C1.D1 | A001 | 66.0.0.1 | MACHINE1 | REMOTE CONTROL |
| S002 | A1.B1.C1.D1 | A001 | 66.0.0.1 | MACHINE2 | REMOTE CONTROL |
| S003 | A1.B1.C1.D1 | A002 | 66.0.0.1 | MACHINE1 | REMOTE CONTROL |
| S004 | A1.B1.C1.D1 | A001 | 66.0.0.1 | MACHINE1 | DATA TRANSFER (TRANSMISSION) FOLDER: CCC |
| S005 | A1.B1.C1.D1 | A001 | 66.0.0.1 | MACHINE1 | DATA TRANSFER (RECEIPT) FOLDER :CCC |
| ... | ... | ... | ... | ... | ... |

JH1

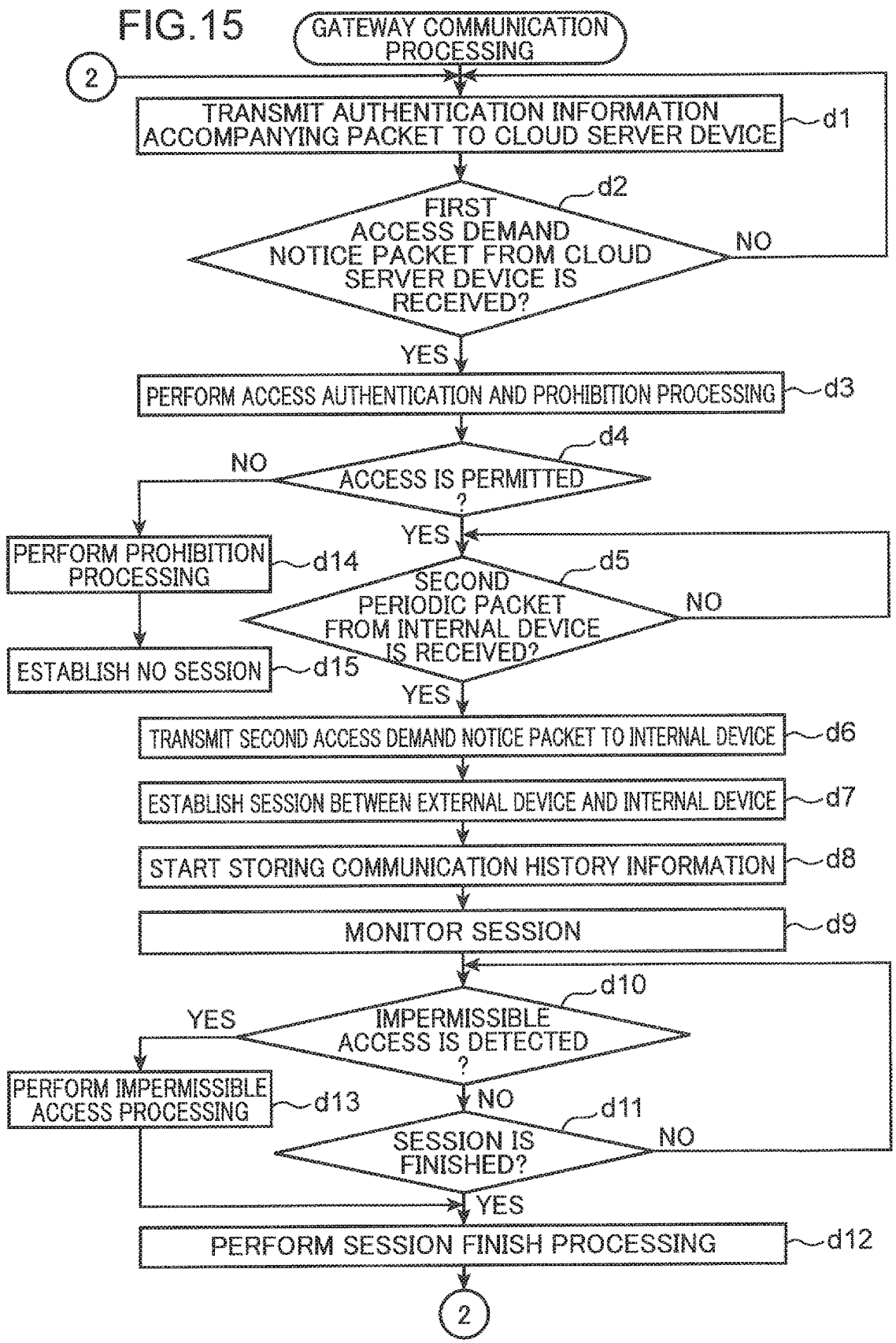

COMMUNICATION NETWORK SYSTEM

CROSS-REFERENCE TO RELATED APPLICATION

This application is a National Stage of International Patent Application No. PCT/JP2017/040686, filed Nov. 13, 2017, the entire content of which is incorporated herein by reference.

BACKGROUND

Technical Field

The present disclosure relates to a communication network system which establishes mutual communication between an external device connected with a global network and an internal device connected with a local area network.

Background Art

Factories manufacturing products are installed with a variety of manufacturing devices therein. For example, a factory which manufactures mounted boards each mounted with electronic components are installed with a plurality of component mounting devices therein. The plurality of component mounting devices each execute a predetermined mounting program with reference to various information necessary for mounting operations of mounting electronic components onto a board, thereby manufacturing a mounted board.

Meanwhile, many factories are built up with a network (local area network) that is local and independent from a global network, e.g., the Internet and Office network, to keep technical information, information about production amount and product quality, and the like away from leaking out. Various manufacturing devices (hereinafter, each referred to as "internal device") which are installed in the factory and include a plurality of component mounting devices and the like are connected with the local area network to enable the internal devices to send and receive information among the internal devices via the local area network.

Meanwhile, a manufacturer who has manufactured an internal device such as a component mounting device is expected to provide information about updating of a program for operating the device and about maintenance and inspection of the device, and a service of executing the maintenance and inspection by a remote operation (remote control). When providing the aforementioned services, the manufacturer of the internal device needs to execute an access to the internal device connected with the local area network from an external device connected with the global network separated from the local network. In this regard, such a technology which enables communication between a global network and a local area network is disclosed, for example, in Japanese Unexamined Patent Publication No. 2004-120534 and Japanese Unexamined Patent Publication No. 2007-006109.

However, it is insufficient to simply enable communication between a global network and a local area network from the perspective of keeping information away from leaking out. Specifically, it is necessary to build a communication network system which can perform in a local area network monitoring as to whether or not accesses to an internal device from an external device include an impermissible access leading to outward information leakage.

SUMMARY

The present disclosure has been worked out in view of the aforementioned circumstances, and provides a communication network system which can perform in a local area network monitoring as to whether or not an impermissible access to an internal device connected with a local area network is executed by an external device connected with a global network.

A communication network system according to one aspect of the present disclosure includes an external device connected with a global network; an internal device connected with a local area network independent from the global network; a server device communicatively connectable with the external device via the global network; and a gateway device which relays communication between the global network and the local area network. The server device is configured to receive from the external device an access demand packet indicating a demand for an access to the internal device, and transmit a first access demand notice packet notifying receipt of the access demand packet to the gateway device, via the global network. The gateway device includes a first communication section which communicates with the server device via the global network; a second communication section which communicates with the internal device via the local area network; a first communication controlling section which controls the first communication section to cause the first communication section to receive the first access demand notice packet transmitted from the server device to the gateway device; a second communication controlling section which controls, upon receiving the first access demand notice packet by the first communication section, the second communication section to cause the second communication section to transmit a second access demand notice packet notifying the receipt of the first access demand notice packet to the internal device to establish a session between the external device and the internal device; and a communication history storage section which stores communication history information about a history of communication between the external device and the internal device after the establishment of the session.

The object, features, and advantages of the present disclosure will be further clarified by the following detailed description and the accompanying drawings.

BRIEF DESCRIPTION OF THE DRAWINGS

FIG. 8 is a table explaining communication history information stored in a communication history storage section included in the gateway device;

FIG. 15 is a flowchart showing a gateway communication processing executed by the gateway device in the communication network system according to the second embodiment.

DETAILED DESCRIPTION

Hereinafter, a communication network system according to each of the embodiments of the present disclosure will be described with reference to the accompanying drawings.

[Communication Network System according to First embodiment]

<Overall Configuration of Communication Network System>

Figure 1:
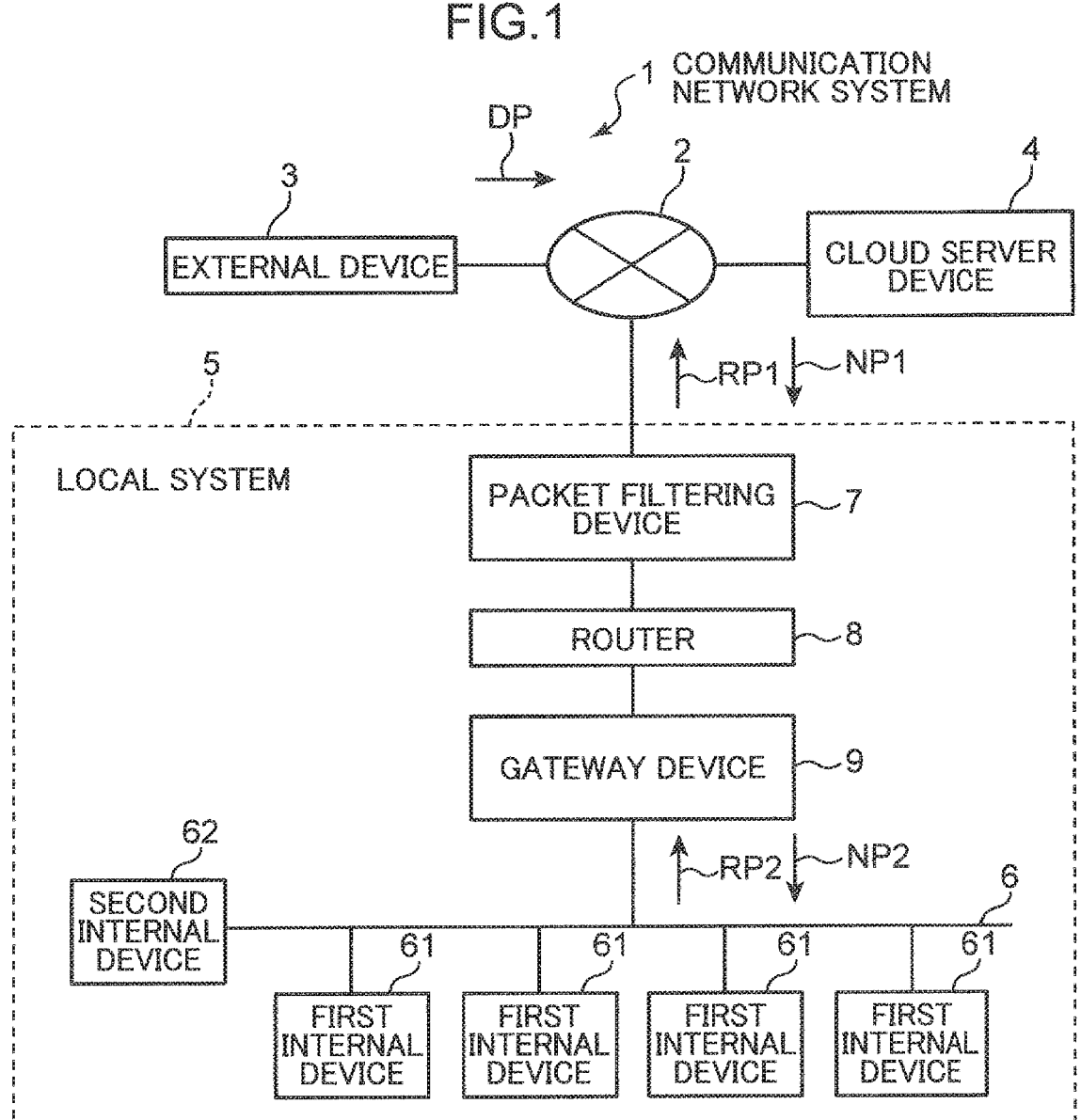
FIG. 1 is a block diagram showing a configuration of a communication network system according to a first embodiment of the present disclosure.

FIG. 1 is a block diagram showing a configuration of a communication network system 1 according to a first embodiment of the present disclosure. The communication network system 1 is a network system which establishes mutual communication between a global network (hereinafter, referred to as "GN") 2 such as the Internet and a local area network (hereinafter, referred to as "LAN") 6. The communication network system 1 includes an external device 3 connected with the GN 2, a cloud server device 4, and a local system 5.

The local system 5 is a system belonging to the LAN 6 independent from GN 2, e.g., a computer network system built in a factory. The local system 5 is built as a system belonging to the LAN 6 independent from GN 2 from the perspective of keeping technical information, information about the production amount and the production quality, and the like away from leaking out. The local system 5 includes a plurality of first internal devices 61 and a second internal device 62 each connected with the LAN 6, a packet filtering device 7, a router 8, and a gateway device 9.

Each of the internal devices 61 is, for example, a manufacturing device such as a component mounting device installed in a factory. The component mounting device serves as a manufacturing device for mounting electronic components onto a board, and executing a predetermined mounting program with reference to various information necessary for mounting operations of mounting the electronic components onto the board, thereby manufacturing a mounted board. The second internal device 62 is a controller which collectively controls the operations of the first internal devices 61. FIG. 1 exemplarily shows four first internal devices 61 and a single second internal device 62 each connected with the LAN 6. The plurality of first internal devices 61 and the second internal device 62 which are installed in the factory and connected with the LAN 6 in this way can send and receive the information among the first and second internal devices 61, 62 via the LAN 6.

The packet filtering device 7 is a device, e.g., a so-called firewall, which imposes a restriction on packet communication between the external device 3 connected with the GN 2 and each of the first and second internal devices 61, 62 connected with the LAN6. The router 8 is a communicator which mutually connects the GN 2 and the LAN 6 with each other, and has a route selecting function of deciding a specific route to be used for transmitting data in a network layer. The gateway device 9 is a relay device which relays the communication between the external device 3 connected with the GN 2 and each of the first and second internal devices 61, 62 connected with the LAN 6. The details of the structure of the gateway device 9 will be described later.

The external device 3 connected with the GN 2 is made up of, for example, a personal computer. The external device 3 is operated by, for example, a manufacturer who has manufactured the first internal devices 61 and the second internal device 62 building the local system 5. The external device 3 is operated to provide information about updating of a program for operating each of the first and second internal devices 61, 62 and about maintenance and inspection of the device, and a service of executing the maintenance and inspection by a remote operation (remote control).

The cloud server device 4 is a virtual server device cooperating with the external device 3 and the gateway device 9 via the GN 2. The cloud server device 4 is communicatively connectable with the external device 3 and the gateway device 9 via the GN 2.

Figure 2:
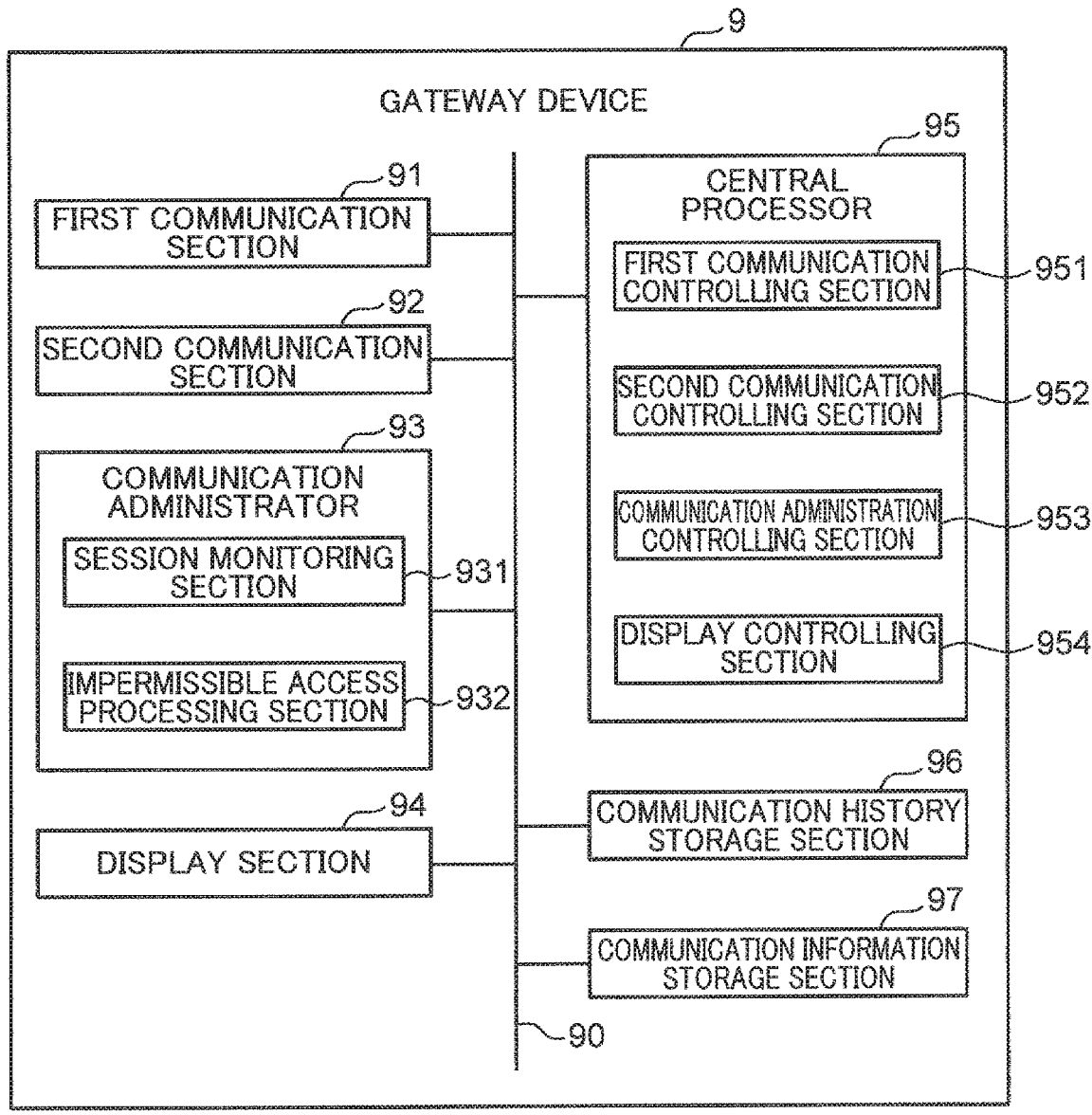
FIG. 2 is a block diagram showing a structure of a gateway device included in the communication network system according to the first embodiment.

In the communication network system 1, a session for the mutual communication between the external device 3 connected with the GN 2 and each of the first and second internal devices 61, 62 connected with the LAN 6 is established by means of packet communication between the cloud server device 4 and the gateway device 9. The structure of the gateway device 9 adapted to establish the session, and the packet communication between the cloud server device 4 and the gateway device 9 will be described with reference to FIGS. 2 to 7. FIG. 2 is a block diagram showing the structure of the gateway device 9 included in the communication network system 1. Each of FIGS. 3 to 7 shows header information of a packet used for establishment of a session between the external device 3 and each of the first and second internal devices 61, 62.

First, the structure of the gateway device 9 will be described with reference to FIG. 2. The gateway device 9 includes a first communication section 91, a second communication section 92, a communication administrator 93, a display section 94, a central processor 95, a communication history storage section 96, and a communication information storage section 97. These sections and components are connected with one another via a bus 90.

The first communication section 91 is an interface circuit for performing communication with the cloud server device 4 via the GN 2. The packet filtering device 7 and the router 8 are arranged on a communication path defined between the first communication section 91 and the cloud server device 4 for the communication therebetween via the GN 2. The first communication section 91 generates a communication signal following the transmission way of the GN 2 on the basis of data from the central processor 95, and converts a communication signal coming from the cloud server device 4 via the GN 2 into data having a format processable by the central processor 95.

The second communication section 92 is an interface circuit for performing communication with the first and second internal devices 61, 62 via the LAN 6. The second communication section 92 generates a communication signal following the transmission way of the LAN 6 on the basis of the data from the central processor 95, and converts a communication signal from each of the first and second internal devices 61, 62 into data having a format processable by the central processor 95.

The central processor 95 is, for example, constituted by a microprocessor and peripheral circuits thereof, and includes a first communication controlling section 951, a second communication controlling section 952, a communication administration controlling section 953, and a display controlling section 954.

The first communication controlling section 951 controls the first communication section 91. The first communication controlling section 951 executes a software group conforming to an internet protocol group composed of a TCP/IP and the like for use in the GN 2. The first communication controlling section 951 has a device driver controlling the first communication section 91 in the lowermost layer, software corresponding to an internet protocol in a datalink layer, software of the IP (Internet Protocol) in a network layer, and software of the TCP (transmission Control Protocol) or the like in the uppermost layer.

Figure 3:
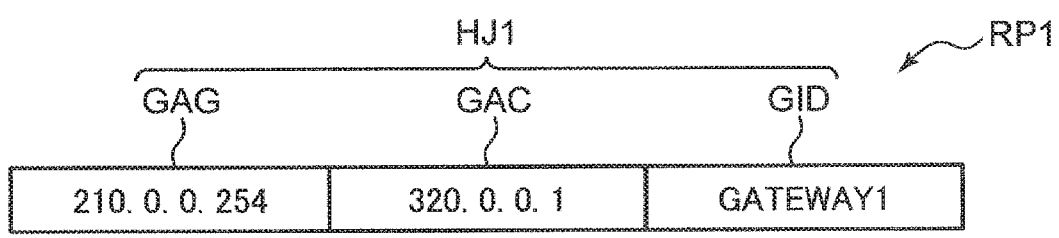
FIG. 3 is a diagram showing header information of a first periodic packet which the gateway device transmits to a cloud server device.

Besides, the first communication controlling section 951 controls the first communication section 91 to cause the first communication section 91 to transmit a first periodic packet RP1 containing header information HJ1 shown in FIG. 3 to the cloud server device 4. The first periodic packet RP1 is a communication packet periodically transmitted from the first communication section 91 to the cloud server device 4 at a predetermined time interval. The header information HJ1 of the first periodic packet RP1 accompanies a global IP address GAG of the gateway device 9 that is a transmitting source of the first periodic packet RP1, a global IP address GAC of the cloud server device 4 to be a destination of the first periodic packet RP1, and a GID of the gateway device 9. FIG. 3 exemplarily shows the header information HJ1 of the first periodic packet RP1 in which the global IP address GAG of the gateway device 9 indicates "210. 0. 0. 254", the global IP address GAC of the cloud server device 4 indicates "320. 0. 0. 1", and the identifier GID of the gateway device 9 indicates "GATEWAY 1".

Moreover, the first communication controlling section 951 controls the first communication section 91 to cause the first communication section 91 to receive a first access demand notice packet NP1 (see FIG. 6) transmitted from the cloud server device 4 to the gateway device 9 in response to the first periodic packet RP1 transmitted from the first communication section 91. Here, preceding to describing the first access demand notice packet NP1 received by the first communication section 91, the packet communication between the external device 3 and the cloud server device 4 via the GN 2 will be described.

Figure 5:
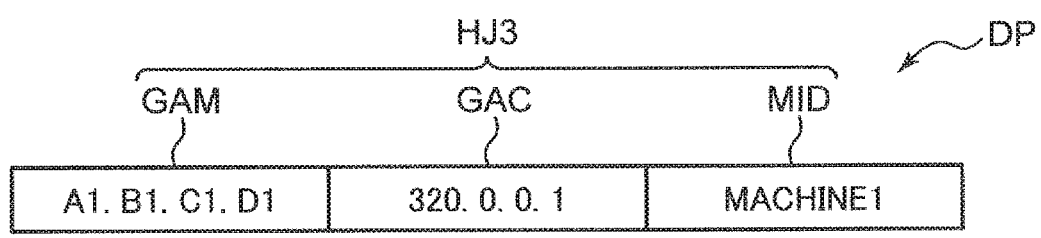
FIG. 5 is a diagram showing header information of an access demand packet which the cloud server device receives from an external device.

The cloud server device 4 receives, from the external device 3 via the GN 2, an access demand packet DP containing header information HJ3 shown in FIG. 5. The access demand packet DP is a communication packet transmitted from the external device 3 to the cloud server device 4 and indicating a demand for an access from the external device 3 to any one of the first and second internal devices 61, 62. The header information HJ3 of the access demand packet DP accompanies a global IP address GAM of the external device 3 that is a transmitting source of the access demand packet DP, the global IP address GAC of the cloud server device 4 to be a destination of the access demand packet DP, and an identifier MID of the one of the first and second internal devices 61, 62 to be an access demanded destination. FIG. 5 exemplarily shows the header information HJ3 of the access demand packet DP in which the global IP address GAM of the external device 3 indicates "A1. B1. C1. D1", the global IP address GAC of the cloud server device 4 indicates "320. 0. 0. 1", and the identifier MID of the one of the first and second internal devices 61, 62 to be the demanded destination indicates "MACHINE 1".

Figure 6:
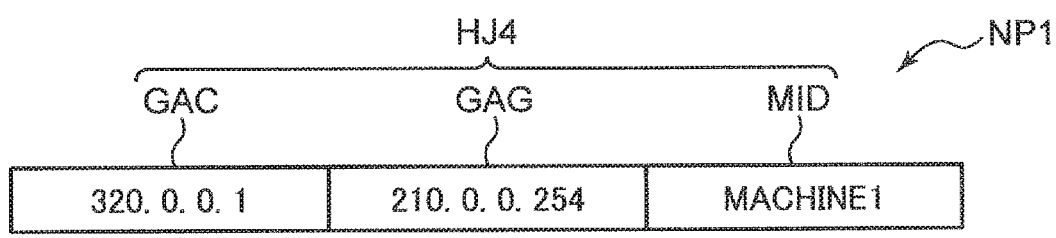
FIG. 6 is a diagram showing header information of a first access demand notice packet which the cloud server device transmits to the gateway device.

Upon receiving the access demand packet DP from the external device 3 and receiving the first periodic packet RP1 from the first communication section 91 of the gateway device 9, the cloud server device 4 transmits to the gateway device 9 the first access demand notice packet NP1 containing header information HJ4 shown in FIG. 6. The first access demand notice packet NP1 is a communication packet notifying to the gateway device 9 the receipt of the access demand packet DP from the external device 3. When transmitting the first access demand notice packet NP1 to the gateway device 9, the cloud server device 4 specifies the global IP address GAG of the gateway device 9 to be the destination with reference to the header information HJ1 of the first periodic packet RP1.

The header information HJ4 of the first access demand notice packet NP1 accompanies the global IP address GAC of the cloud server device 4 that is the transmitting source of the first access demand notice packet NP1, the global IP address GAG of the gateway device 9 to be the destination of the first access demand notice packet NP1, and the identifier MID of the one of the first and second internal devices 61, 62 to be the access demanded destination. FIG. 6 exemplarily shows the header information HJ4 of the first access demand notice packet NP1 in which the global IP address GAC of the cloud server device 4 indicates "320. 0. 0. 1", the global IP address GAG of the gateway device 9 indicates "210. 0. 0. 254", and the identifier MID of the one of the first and second internal devices 61, 62 to be the access demanded destination indicates "MACHINE 1".

It is seen from the foregoing that the first communication controlling section 951 in the central processor 95 of the gateway device 9 causes the first communication section 91 to receive the first access demand notice packet NP1 transmitted from the cloud server device 4 to the gateway device 9 in response to the first periodic packet RP1 transmitted from the first communication section 91.

The second communication controlling section 952 controls the second communication section 92. The second communication controlling section 952 executes a software group conforming to a communication protocol for use in the LAN 6. The second communication controlling section 952 includes a device driver controlling the second communication section 92 in the lowermost layer, software corresponding to a communication protocol for use in the LAN 6 in a datalink layer, software corresponding to the communication protocol for use in the LAN 6 in a network layer, and software corresponding to the communication protocol for use in the LAN 6 in the uppermost layer.

Figure 4:
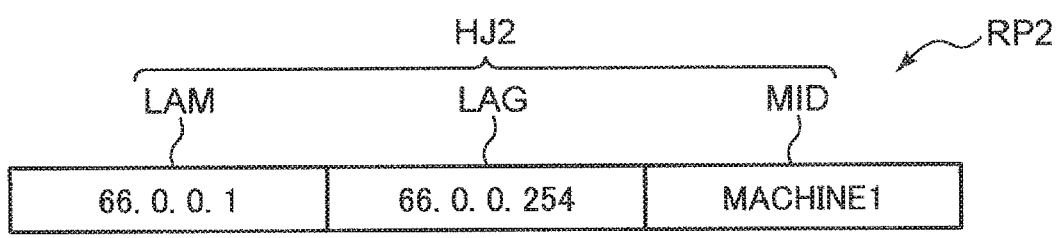
FIG. 4 is a diagram showing header information of a second periodic packet which the gateway device receives from an internal device.

Furthermore, the second communication controlling section 952 controls the second communication section 92 to cause the second communication section 92 to receive a second periodic packet RP2 containing header information HJ2 shown in FIG. 4. The second periodic packet RP2 is a communication packet periodically transmitted from each of the first and second internal devices 61, 62 to the gateway device 9 at a predetermined time interval. The header information HJ2 of the second periodic packet RP2 accompanies a local IP address LAM of any one of the first and second internal devices 61, 62 that is a transmitting source of the second periodic packet RP2, a local IP address LAG of the gateway device 9 to be a destination of the second periodic packet RP2, and an identifier MID of the one of the first and second internal devices 61, 62. FIG. 4 exemplarily shows the header information HJ2 of the second periodic packet RP2 in which the local IP address LAM of the one of the first and second internal devices 61, 62 indicates "66. 0. 0. 1", the local IP address LAG of the gateway device 9 indicates "66. 0. 0. 254", and the identifier MID of the one of the first and second internal devices 61, 62 indicates "MACHINE 1".

Figure 7:
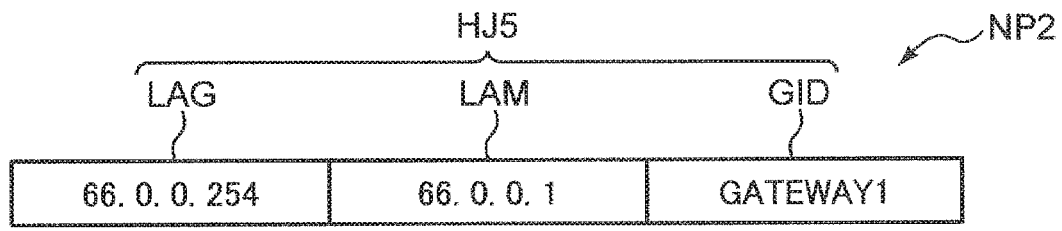
FIG. 7 is a diagram showing header information of a second access demand notice packet which the gateway device transmits to the internal device.

Moreover, the second communication controlling section 952 causes, upon receiving the first access demand notice packet NP1 by the first communication section 91, the second communication section 92 to transmit to the one of the first and second internal devices 61, 62 a second access demand notice packet NP2 containing header information HJ5 shown in FIG. 7 in response to the second periodic packet RP2 transmitted from the one of the first and second internal devices 61, 62 to the gateway device 9. In other words, upon receiving the first access demand notice packet NP1 by the first communication section and receiving the second periodic packet RP2 by the second communication section 92, the second communication controlling section 952 causes the second communication section 92 to transmit the second access demand notice packet NP2 to the one of the first and second internal devices 61, 62. The second access demand notice packet NP2 is a communication packet notifying to the one of the first and second internal devices 61, 62 the receipt of the first access demand notice packet NP1 from the cloud server device 4. For the transmitting of the second access demand notice packet NP2 to the one of the first and second internal devices 61, 62, the second communication controlling section 952 specifies the local IP address LAM of the one of the first and second internal devices 61, 62 to be the destination with reference to the header information HJ2 of the second periodic packet RP2.

Although described above is the configuration in which, for the transmitting of the second access demand notice packet NP2 to the one of the first and second internal devices 61, 62, the second communication controlling section 952 specifies the local IP address LAM of a specific one of the first and second internal devices 61, 62 with reference to the header information HJ2 of the second periodic packet RP2, the second communication controlling section 952 should not be limited thereto. The second communication controlling section 952 may be configured to cause, upon receiving the first access demand notice packet NP1 by the first communication section 91, the second communication section 92 to transmit the second access demand notice packet NP2 to the one of the first and second internal devices 61, 62 with reference to local communication information stored in the communication information storage section 97 included in the gateway device 9. The local communication information is stored in the communication information storage section 97 in advance and associates the local IP address LAM and the identifier MID of each of the first and second internal devices 61, 62 with each other, the local IP address LAM and the identifier MID being used for communication with the one of the first and second internal devices 61, 62. In this configuration, for the transmitting of the second access demand notice packet NP2 to the one of the first and second internal devices 61, 62, the second communication controlling section 952 specifies the local IP address of the one of the first and second internal devices 61, 62 to be the destination with reference to the local communication information.

The header information HJ5 of the second access demand notice packet NP2 accompanies the local IP address LAG of the gateway device 9 that is the transmitting source of the second access demand notice packet NP2, the local IP address LAM of the one of the first and second internal devices 61, 62 to be the destination of the second access demand notice packet NP2, and the identifier GID of the gateway device 9. FIG. 7 exemplarily shows the header information HJ5 of the second access demand notice packet NP2 in which the local IP address LAG of the gateway device 9 indicates "66. 0. 0. 254", the local IP address LAM of the one of the first and second internal devices 61, 62 indicates "66. 0. 0. 1", and the identifier GID of the gateway device 9 indicates "GATEWAY 1".

The second communication controlling section 952 causes the second communication section 92 to transmit the second access demand notice packet NP2 to the one of the first and second internal devices 61, 62 to establish a session for mutual communication between the external device 3 and the one of the first and second internal devices 61, 62. After the establishment of the session between the external device 3 and the one of the first and second internal devices 61, 62, the external device 3 can provide information about updating of a program for operating the one of the first and second internal devices 61, 62 and about maintenance and inspection of the device, and a service of executing the maintenance and inspection by a remote operation (remote control). A communication processing by means of packet communication between the cloud server device 4 and the gateway device 9 to establish a session between the external device 3 and each of the first and second internal devices 61, 62 in the communication network system will be described in detail later.

The communication administration controlling section 953 controls the communication administrator 93 in the central processor 95 of the gateway device 9. As shown in FIG. 2, the communication administrator 93 includes a session monitoring section 931, and an impermissible access processing section 932.

The session monitoring section 931 monitors a session between the external device 3 and each of the first and second internal devices 61, 62. The session monitoring section 931 detects an impermissible access from the external device 3 to each of the first and second internal devices 61, 62 by monitoring the session in accordance with a predetermined access criterion in the gateway device 9. The access criterion represents information showing a permissible range of accesses from the external device 3 to each of the first and second internal devices 61, 62. The access criterion set in the gateway device 9 includes, for example, an access permissible external identifier, an access permissible internal identifier, and access permissible communication content information. The access permissible external identifier represents an identifier of the external device 3 permitted to execute an access to any one of the first and second internal devices 61, 62. The access permissible internal identifier represents an identifier of the one of first and second internal devices 61, 62 permitting the external device 3 to execute the access thereto. The access permissible communication content information represents information about a communication content to be permitted after the establishment of the session between the external device 3 and the one of the first and second internal devices 61, 62. The communication content represents a content of mutual communication between the external device 3 and the one of the first and second internal devices 61, 62 after the establishment of the session. For example, the communication content includes the remote operation (remote control) from the external device 3, and a data transfer between the external device 3 and the one of the first and second internal devices 61, 62.

The session monitoring section 931 detects an access to any one of the first and second internal devices 61, 62 from the external device 3 having an identifier other than the identifier represented by the access permissible external identifier as an impermissible access. The session monitoring section 931 further detects an access from the external device 3 to any one of the first and second internal devices 61, 62 having an identifier other than the identifier represented by the access permissible internal identifier as an impermissible access. Additionally, the session monitoring section 931 detects mutual communication based on a communication content other than the communication content represented by the access permissible communication content information between the external device and any one of the first and second internal devices 61, 62 as an impermissible access. The session monitoring section 931 outputs impermissible access detection information when detecting such an impermissible access from the external device 3 to any one of the first and second internal devices 61, 62.

Meanwhile, the session monitoring section 931 may execute the monitoring operation of monitoring a session between the external device 3 and each of the first and second internal devices 61, 62 with reference to or without reference to communication history information stored in the communication history storage section 96 that will be described later.

The impermissible access processing section 932 performs at least one of a warning processing of notifying the impermissible access detection information and a disconnecting processing of disconnecting the communication between the external device 3 and the one of the first and second internal devices 61, 62, when the session monitoring section 931 outputs the impermissible access detection information.

When the warning processing is performed by the impermissible access processing section 932, the display controlling section 954 in the central processor 95 of the gateway device 9 controls the display section 94 to cause the display section 94 to display the impermissible access detection information. The impermissible access detection information displayed on the display section 94 includes a message indicating, for example, "an impermissible access is detected", or the like. Furthermore, when the disconnecting processing is performed by the impermissible access processing section 932, the display controlling section 954 controls the display section 94 to cause the display section 94 to display communication disconnection information. The communication disconnection information displayed on the display section 94 includes a message indicating, for example, "mutual communication is disconnected", or the like.

The communication history storage section 96 of the gateway device 9 stores the communication history information about a history of mutual communication between the external device 3 and each of the first and second internal devices 61, 62 after the establishment the session. FIG. 8 is a table explaining communication history information JH1 stored in the communication history storage section 96.

The communication history information JH1 stored in the communication history storage section 96 associates session start date and time information JH 11, the global IP address GAM of the external device 3, an identifier MGID of the external device 3, the local IP address LAM of each of the first and second internal devices 61, 62, the identifier MID of each of the first and second internal devices 61, 62, and communication content information JH12 with one another.

In the communication history information JH1, the session start date and time information JH11 represents a date and time ("SESSION START DATE AND TIME") at which each session is started between the external device 3 and any one of the first and second internal devices 61, 62. FIG. 8 exemplarily shows that the session start date and time information JH11 indicates different session start dates and times at "S001", "S002", "S003", "S004", and "S005" respectively.

Further, in the communication history information JH1, the global IP address GAM of the external device 3 is information representing the global IP address of the external device 3 that is an access demanding source ("IP ADDRESS OF ACCESS DEMANDING SOURCE") to the one of the first and second internal devices 61, 62. FIG. 8 exemplarily shows that, as the global IP address GAM of the external device 3, the same address "A1. B1. C1. D1" is associated with each of the session start dates and times.

In the communication history information JH1, the identifier MGID of the external device 3 is information representing the identifier of the external device 3 that is the access demanding source ("ID OF ACCESS DEMANDING SOURCE") to the one of first and second internal devices 61, 62. FIG. 8 exemplarily shows that, as the identifier MGID of the external device, "A001" is associated with each of the session start dates and times at "S001", "S002", "S004", and "S005", and "A002" is associated with the session start date and time at "S003".

In the communication history information JH1, the local IP address LAM of the one of first and the second internal devices 61, 62 is information representing the local IP address of the one of the first and second internal devices 61, 62 to be the access destination ("IP ADDRESS OF ACCESS DESTINATION") accessed by the external device 3. FIG. 8 exemplarily shows that the same address "6. 6. 0. 0. 1" serving as the local IP address LAM is associated with each of the session start dates and times.

In the communication history information JH1, the identifier MID of the one of the first and the second internal devices 61, 62 is information representing the identifier of the one of the first and second internal devices 61, 62 to be the access destination ("ID OF ACCESS DETERMINATION") accessed by the external device 3. FIG. 8 exemplarily shows that, as the identifier of the one of the first and second internal devices 61, 62, "MACHINE 1" is associated with the session start dates and times at "S001", "S003", "S004" and "S005" respectively, and the "MACHINE 2" is associated with the session start date and time at "S002".

Further, in the communication history information JH1, the communication content information JH12 represents a content of mutual communication ("COMMUNICATION CONTENT") performed between the external device 3 and the one of the first and second internal devices 61, 62. FIG. 8 exemplarily shows that, as the communication content information JH12, "REMOTE CONTROL" is associated with the session start dates and times at "S001", "S002", and "S003" respectively, "DATA TRANSFER (TRANSMISSION) FOLDER: CCC" is associated with the session start date and time at "S004", and "DATA TRANSFER (RECEIPT) FOLDER: CCC" is associated with the session start time at "S005".

<Communication Processing for Establishment of Session between External Device and Internal Device>

Figure 9:
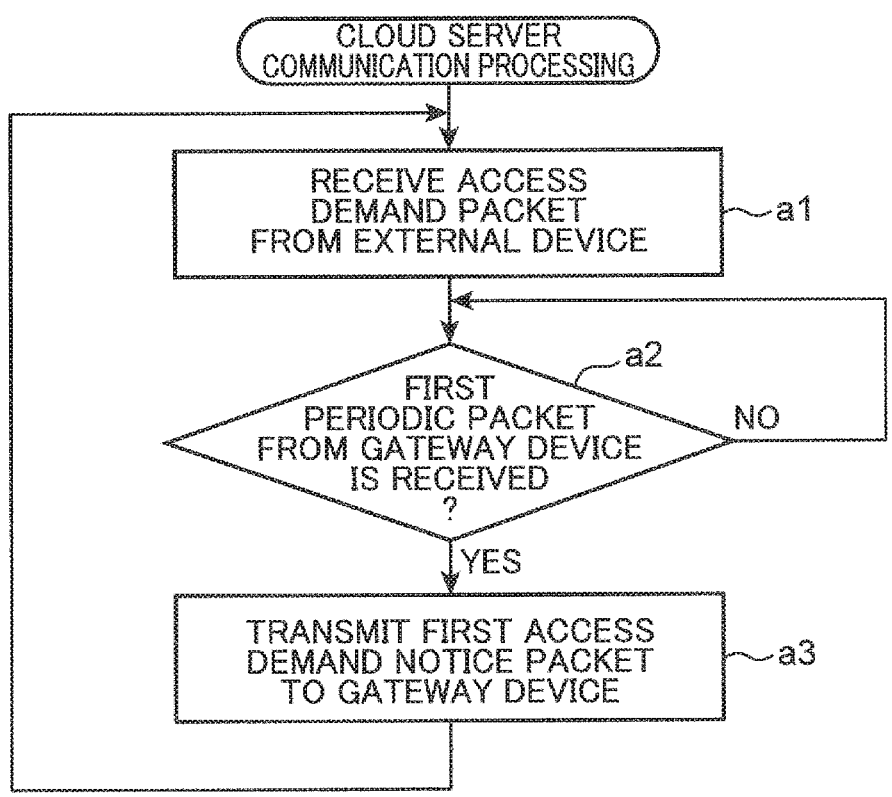
FIG. 9 is a flowchart showing a cloud server communication processing executed by the cloud server device in the communication network system according to the first embodiment.
Figure 10:
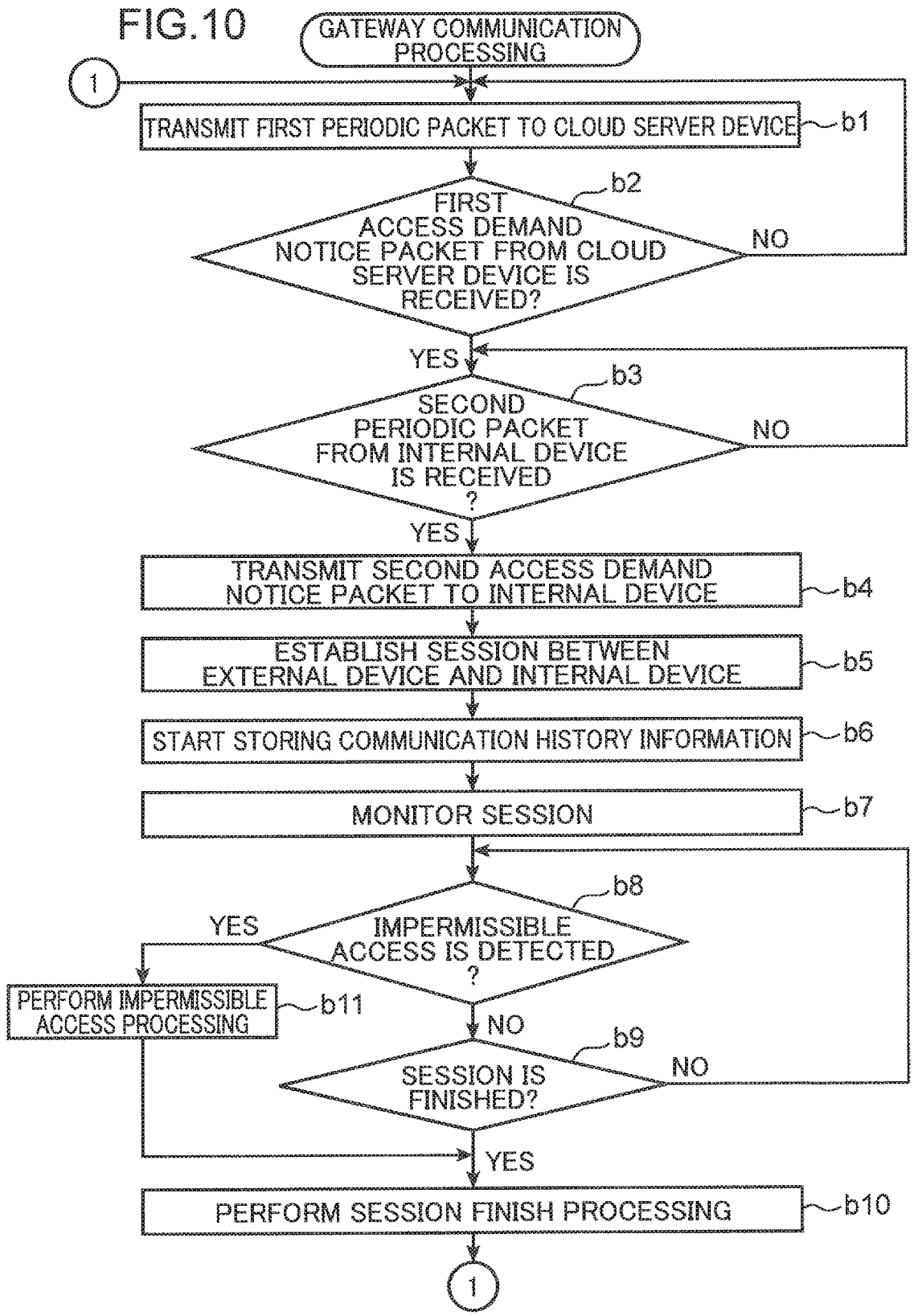
FIG. 10 is a flowchart showing a gateway communication processing executed by the gateway device in the communication network system according to the first embodiment.

Next, a communication processing by means of packet communication between the cloud server device 4 and the gateway device 9 for establishment of a session between the external device 3 and each of the first and second internal devices 61, 62 in the communication network system 1 will be described with reference to flowcharts shown in FIGS. 9 and 10. FIG. 9 is a flowchart showing a cloud server communication processing executed by the cloud server device 4 in the communication network system 1. FIG. 10 is a flowchart showing a gateway communication processing executed by the gateway device 9 in the communication network system 1.

As described above, in the communication network system 1 according to this embodiment, the cloud server device 4 is communicatively connectable with the external device 3 via the GN 2, and the gateway device 9 is communicative with the cloud server device 4 via the GN 2 owing to the first communication section 91 and further communicative with the first and second internal devices 61, 62 via the LAN 6 owing to the second communication section 92. The external device 3 connected with the GN 2 and each of the first and second internal devices 61, 62 connected with the LAN 6 define therebetween a communication path including a communication path section which the cloud server device 4 builds up to reach the external device 3 via the GN 2, and another communication path section which the gateway device 9 relays between the GN 2 and the LAN 6.

(Cloud Server Communication Processing of Cloud Server Device)

The cloud server device 4 executes a cloud server communication processing by means of packet communication to establish a session between the external device 3 and each of the first and second internal devices 61, 62. First, the cloud server device 4 receives an access demand packet DP (see FIG. 5) from the external device 3 via the GN 2 (step a1). Subsequently, the cloud server device 4 determines whether or not the cloud server device 4 receives a first periodic packet RP1 (see FIG. 3) from the first communication section 91 of the gateway device 9 (step a2). The cloud server device 4 waits until receiving the first periodic packet RP1 from the first communication section 91 of the gateway device 9. Upon receiving the first periodic packet RP1, the cloud server device 4 transmits a first access demand notice packet NP1 (see FIG. 6) to the gateway device 9 (step a3) in response to the first periodic packet RP1. The cloud server device 4 returns to the step a1 of the flow after the transmission of the first access demand notice packet NP1 is completed, and repeats the sequence of the steps a1 to a3.

(Gateway Communication Processing of Gateway Device)

The gateway device 9 executes a gateway communication processing by means of packet communication to establish a session between the external device 3 and each of the first and second internal devices 61, 62. As shown in FIG. 10, the first communication controlling section 951 in the gateway device 9 causes the first communication section 91 to transmit a first periodic packet RP1 (see FIG. 3) to the cloud server device 4 (step b1). Subsequently, the first communication controlling section 951 determines whether or not the first communication section 91 receives a first access demand notice packet NP1(see FIG. 6) from the cloud server device 4 (step b2). The first communication controlling section 951 waits until the first communication section 91 receives the first access demand notice packet NP1. Further, the second communication controlling section 952 in the gateway device 9 determines whether or not the second communication section 92 receives a second periodic packet RP2 (see FIG. 4) from any one the first and second internal devices 61, 62 (step b3). The second communication controlling section 952 waits until the second communication section 92 receives the second periodic packet RP2.

Upon receiving the first access demand notice packet NP1 by the first communication section 91 and receiving the second periodic packet RP2 by the second communication section 92, the second communication controlling section 952 causes the second communication section 92 to transmit a second access demand notice packet NP2 (see Fig) to the one of the first and second internal devices 61, 62 (step b4). The second communication controlling section 952 causes the second communication section 92 to transmit the second access demand notice packet NP2 to the one of the first and second internal devices 61, 62 to establish a session for mutual communication between the external device 3 and the one of the first and second internal devices 61, 62 (step b5).

It should be noted here that the communication target of the external device 3 via the GN 2 is the cloud server device 4. Hence, regarding a global IP address to be used for the communication via the GN 2, it is sufficient to disclose the corresponding address of the cloud server device 4 to the external device 3 without disclosing the address of the gateway device 9 thereto. In this manner, a direct access from the external device 3 to the one of the first and second internal devices 61, 62 via the gateway device 9 can be restricted. As a result, this configuration makes it possible to reliably prevent an impermissible access leading to outward information leakage among accesses from the external device 3 to the one of the first and second internal devices 61, 62, thereby ensuring an advanced safety from the perspective of security.

As aforementioned, the second communication controlling section 952 should not be limited to the configuration in which the second communication controlling section 952 refers to the second periodic packet RP2 to establish a session for mutual communication between the external device 3 and any one of the first and second internal devices 61, 62. Instead, the second communication controlling section 952 may be configured to refer to the local communication information stored in the communication information storage section 97. In this configuration, the step b3 is omitted from the flowchart shown in FIG. 10. The second communication controlling section 952 causes, upon receiving the first access demand notice packet NP1 by the first communication section 91, the second communication section 92 to transmit the second access demand notice packet NP2 to the one of the first and second internal devices 61, 62 with reference to the local communication information stored in the communication information storage section 97 in step b4.

After the establishment of the session between the external device 3 and the one of the first and second internal devices 61, 62, the communication history storage section 96 stores communication history information JH1 (see FIG.

8) about a history of the mutual communication between the external device 3 and the one of the first and second internal devices 61, 62 (step b6).

The gateway device 9 including the communication history storage section 96 constitutes a part of the local system 5 belonging to the LAN 6 independent from the GN 2, and is communicative with the first and second internal devices 61, 62 via the LAN 6 owing to the second communication section 92. This configuration makes it possible to perform, in the LAN 6 built in the local system 5, monitoring as to whether or not an impermissible access to each of the first and second internal devices 61, 62 is executed by the external device 3 with reference to the communication history information JH1 stored in the communication history storage section 96 of the gateway device 9.

The session monitoring section 931 in the gateway device 9 monitors a session between the external device 3 and each of the first and second internal devices 61, 62 (step b7). The session monitoring section 931 determines by monitoring the session whether or not an impermissible access to any one of the first and second internal devices 61, 62 is executed by the external device 3 (step b8). When the session monitoring section 931 detects no impermissible access, the communication administrator 93 determines whether or not the session between the external device 3 and the one of the first and second internal devices 61, 62 finishes (step b9), and further executes a session finish processing of finishing the session (step b10).

Conversely, when the session monitoring section 931 detects an impermissible access and outputs impermissible access information, the impermissible access processing section 932 performs at least one of impermissible access processings, that is, one of a warning processing of notifying the impermissible access detection information and a disconnecting processing of disconnecting the communication between the external device 3 and the one of the first and second internal devices 61, 62 (step b11).

From these aspects, in the case that an impermissible access to any one of the first and second internal devices 61, 62 is executed by the external device 3, the session monitoring section 931 detects the impermissible access, and the impermissible access processing section 932 performs the warning processing and/or the disconnecting processing of the communication. The gateway device 9 including the session monitoring section 931 and the impermissible access processing section 932 constitutes a part of the local system 5 belonging to the LAN 6 independent from the GN 2 to be communicative with the first and second internal devices 61, 62 via the LAN 6 owing to the second communication section 92. Consequently, it is possible to perform, in the LAN 6 built in the local system 5, the monitoring as to whether or not an impermissible access to each of the first and the second internal devices 61, 62 is executed by the external device 3.

[Communication Network System according to Second Embodiment]

<Overall Configuration of Communication Network System>

Figure 11:
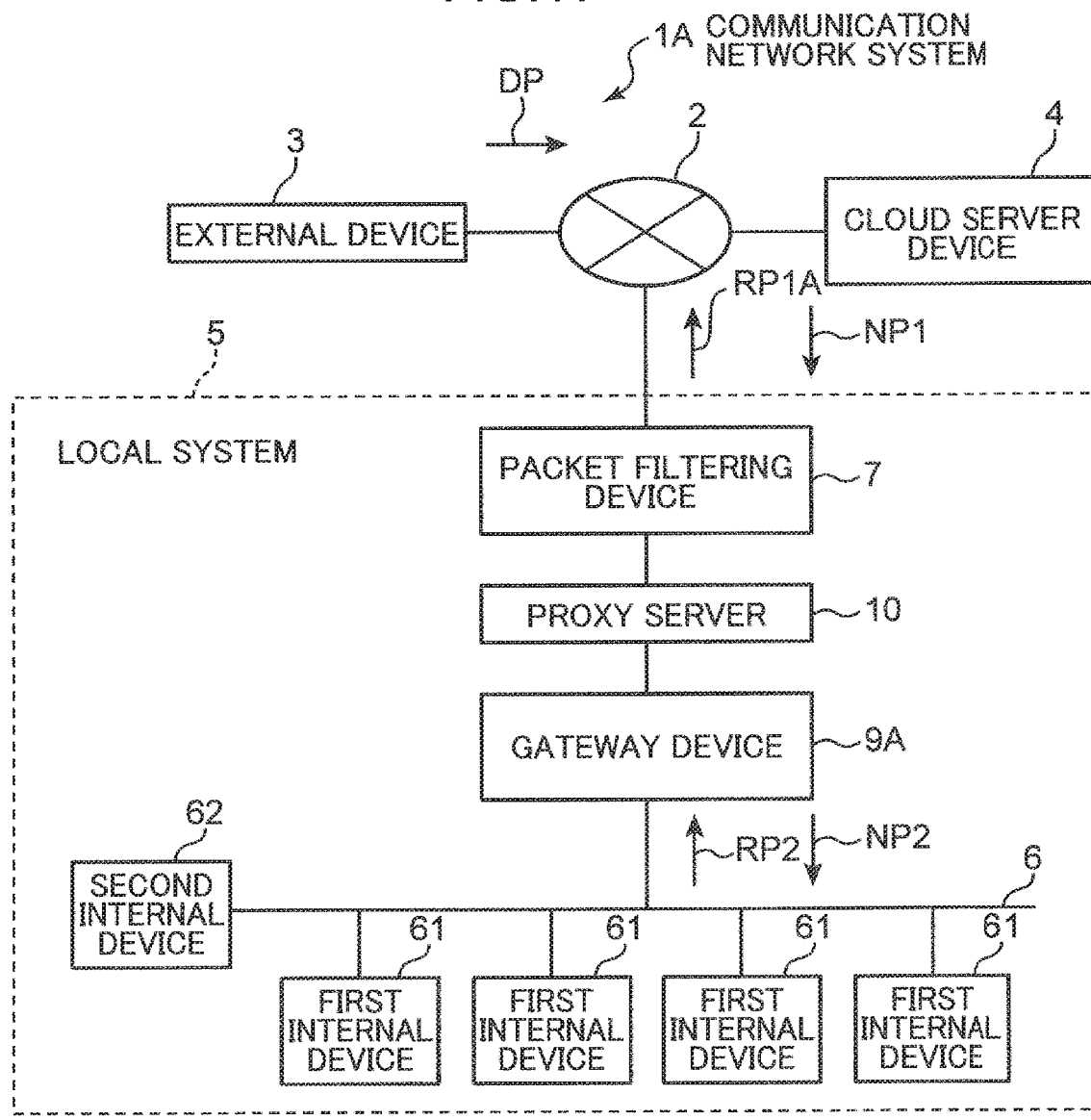
FIG. 11 is a block diagram showing a configuration of a communication network system according to a second embodiment of the present disclosure.
Figure 12:
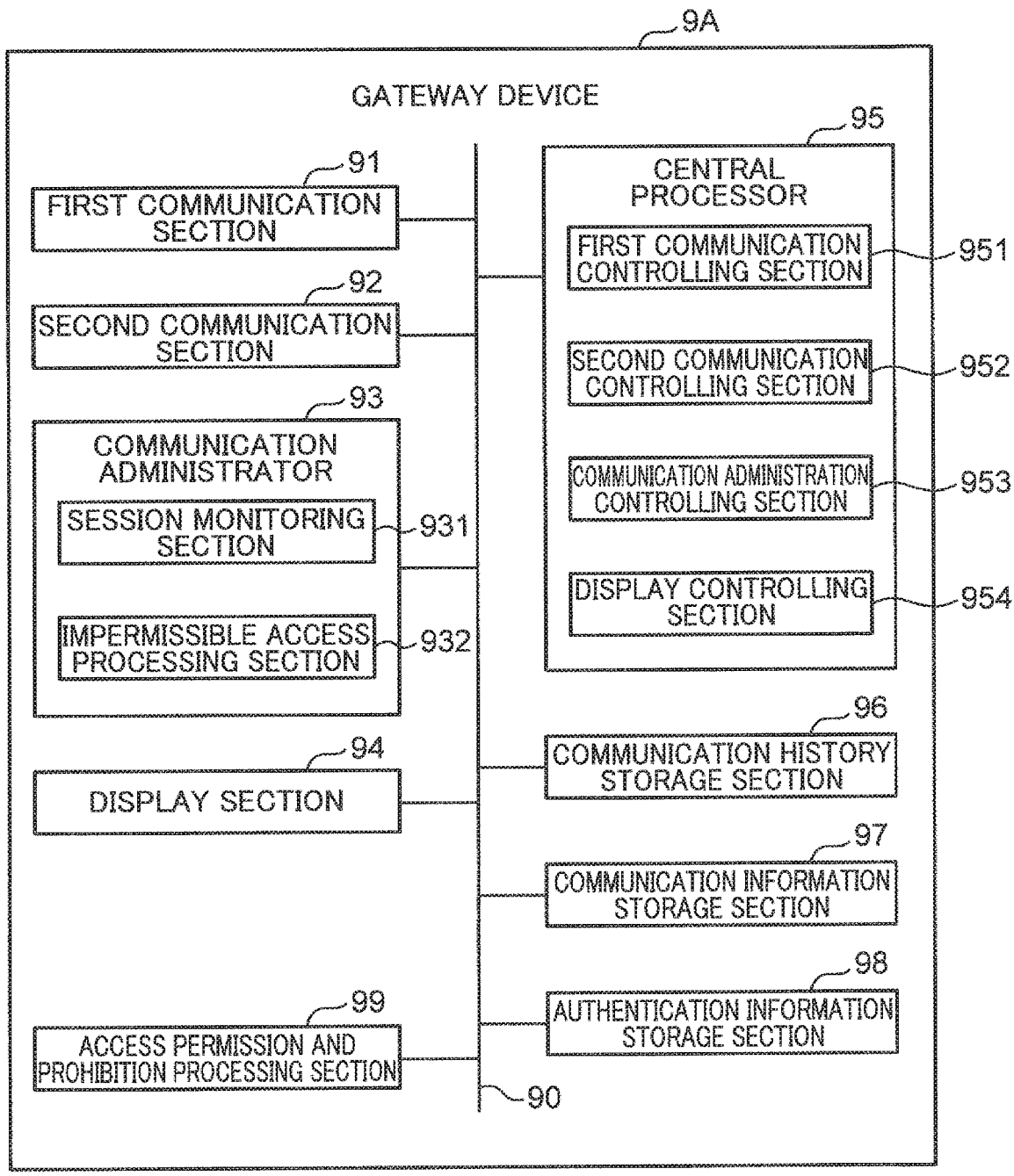
FIG. 12 is a block diagram showing a structure of a gateway device included in the communication network system according to the second embodiment.

FIG. 11 is a block diagram showing a configuration of a communication network system 1A according to a second embodiment of the present disclosure. FIG. 12 is a block diagram showing a structure of a gateway device 9A included in the communication network system 1A according to the second embodiment. The communication network system 1A according to the second embodiment includes a proxy server 10 in a local system 5. In this respect, the structure of the gateway device 9A is different from that of the gateway device 9 in the communication network system 1 according to the above-described first embodiment. Except for this difference, the communication network system 1A is configured in the same manner as the communication network system 1 according to the first embodiment. Hence, the communication network system 1A according to the second embodiment has components and sections identical to those of the communication network system 1 according to the first embodiment. Accordingly, the identical components and sections are given with the same reference signs in the following description and the accompanying drawings, and the descriptions of the components and sections may be omitted.

The proxy server 10 included in the local system 5 is a server device which performs an authentication processing of authenticating communication executed by the first communication section 91 between a cloud server device 4 and the gateway device 9A via the GN 2.

The gateway device 9A included in the communication network system 1A further includes an authentication information storage section 98, and an access permission and prohibition processing section 99 as new sections, in addition to a first communication section 91, a second communication section 92, a communication administrator 93 having a session monitoring section 931 and an impermissible access processing section 932, a display section 94, a central processor 95, a communication history storage section 96, and a communication information storage section 97 like those of the gateway device 9.

The authentication information storage section 98 in the gateway device 9A stores authentication information for use in the authentication processing of the proxy server 10. The authentication information for use in the authentication processing of the proxy server 10 includes an authentication identifier (authentication ID) and a password.

Figure 13:
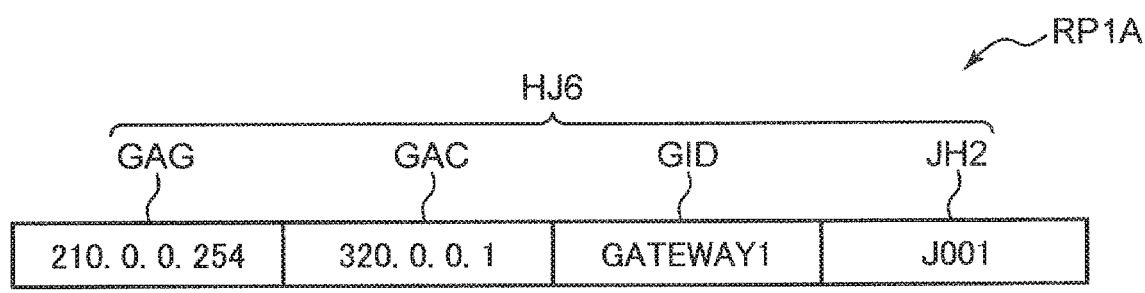
FIG. 13 is a diagram showing header information of an authentication information accompanying packet which the gateway device transmits to the cloud server device.

The first communication controlling section 951 in the gateway device 9A including the authentication information storage section 98 which stores the authentication information controls the first communication section 91 to cause the first communication section 91 to transmit to the cloud server device 4 an authentication information accompanying packet RP1A containing header information HJ6 shown in FIG. 13 as a first periodic packet. The authentication information accompanying packet RP1A is a communication packet periodically transmitted from the first communication section 91 to the cloud server device 4 at a predetermined time interval. The header information HJ 6 of the authentication information accompanying packet RP1A accompanies a global IP address GAG of the gateway device 9A that is a transmitting source of the authentication information accompanying packet RP1A, a global IP address GAC of the cloud server device 4 to be a destination of the authentication information accompanying packet RP1A, an identifier GID of the gateway device 9A, and authentication information JH2 stored in the authentication information storage section 98. FIG. 13 exemplarily shows the header information HJ6 of the authentication information accompanying packet RP1A in which the global IP address GAG of the gateway device 9 indicates "210. 0. 0. 254", the global IP address GAC of the cloud server device 4 indicates "320. 0. 0. 1", the identifier GID of the gateway device 9A indicates "GATEWAY 1", and the authentication information JH2 indicates "J001".

Moreover, the first communication controlling section 951 controls the first communication section 91 to cause the first communication section 91 to receive a first access demand notice packet NP1 (see FIG. 6) transmitted from the cloud server device 4 to the gateway device 9A in response to the authentication information accompanying packet RP1A transmitted from the first communication section 91.

Upon receiving an access demand packet DP (see FIG. 5) from the external device 3 and receiving the authentication information accompanying packet RP1A from the first communication section 91 of the gateway device 9A, the cloud server device 4 transmits the first access demand notice packet NP1 to the gateway device 9A. When transmitting the first access demand notice packet NP1 to the gateway device 9A, the cloud server device 4 specifies the global IP address GAG of the gateway device 9A to be the destination and specifies the authentication information for use in the authentication processing of the proxy server 10 with reference to the header information HJ6 of the authentication information accompanying packet RP1A.

Meanwhile, in the communication network system IA, header information HJ3 of the access demand packet DP transmitted from the external device 3 to the cloud server device 4 contains an identifier of the external device 3 and communication content information, in addition to the global IP address GAM of the external device 3, the global IP address GAC of the cloud server device 4, and the identifier MID of any one of the first and second internal devices 61, 62 to be an access demanded destination. The communication content information contained in the header information HJ3 of the access demand packet DP represents a content of mutual communication between the external device 3 and the one of the first and second internal devices 61, 62 after establishment of a session. For example, the communication content includes a remote operation (remote control) from the external device 3, and a data transfer between the external device 3 and the one of the first and second internal devices 61, 62.

Further, in the communication network system IA, header information HJ4 of the first access demand notice packet NP1 transmitted from the cloud server device 4 to the gateway device 9A includes the identifier of the external device 3 and the communication content information respectively accompanied by the header information HJ3 of the access demand packet DP, in addition to the global IP address GAC of the cloud server device 4, the global IP address GAG of the gateway device 9A, and the identifier MID of the one of the first and second internal devices 61, 62 to be the access demanded destination.

The access permission and prohibition processing section 99 in the gateway device 9A performs a permission processing or a prohibition processing when the first communication section 91 receives the first access demand notice packet NP1 under the control of the first communication controlling section 951. The permission processing performed by the access permission and prohibition processing section 99 is a processing of permitting an access from the external device 3 to the one of the first and second internal devices 61, 62 in accordance with a predetermined access criterion. Further, the prohibition processing performed by the access permission and prohibition processing section 99 is a processing of prohibiting the access from the external device 3 to the one of the first and second internal devices 61, 62 in accordance with the predetermined access criterion.

The access criterion referred to by the access permission and prohibition processing section 99 when performing the permission processing and the prohibition processing is the same as the above-described access criterion referred to by the session monitoring section 931 when performing the monitoring, and represents information showing a permissible range of accesses from the external device 3 to each of the first and second internal devices 61, 62. The access criterion includes the aforementioned access permissible external identifier, access permissible internal identifier, and access permissible communication content information.

When the first communication section 91 receives a first access demand notice packet NP1 containing header information accompanying information which matches the access permissible external identifier, the access permissible internal identifier, and the access permission communication content information each serving as the access criterion, the access permission and prohibition processing section 99 performs the permission processing of permitting the access from the external device 3 to the one of the first and second internal devices 61, 62. Conversely, when the first communication section 91 receives a first access demand notice packet NP1 containing header information accompanying information which mismatches the access criterion, the access permission and prohibition processing section 99 performs the prohibition processing of prohibiting the access from the external device 3 to the one of the first and second internal devices 61, 62.

A second communication controlling section 952 in the gateway device 9A causes the second communication section 92 to transmit a second access demand notice packet NP2 (see FIG. 7) to the one of the first and second internal devices 61, 62 to establish a session between the external device 3 and the one of the first and second internal devices 61, 62 when the permission processing is performed by the access permission and prohibition processing section 99. Conversely, the second communication controlling section 952 causes the second communication section 92 not to transmit the second access demand notice packet NP2 to the one of the first and second internal devices 61, 62 to establish no session between the external device 3 and the one of the first and second internal devices 61, 62 when the prohibition processing is performed by the permission and prohibition processing section 99.

<Communication Processing for Establishment of Session between External Device and Internal Device>

Figure 14:
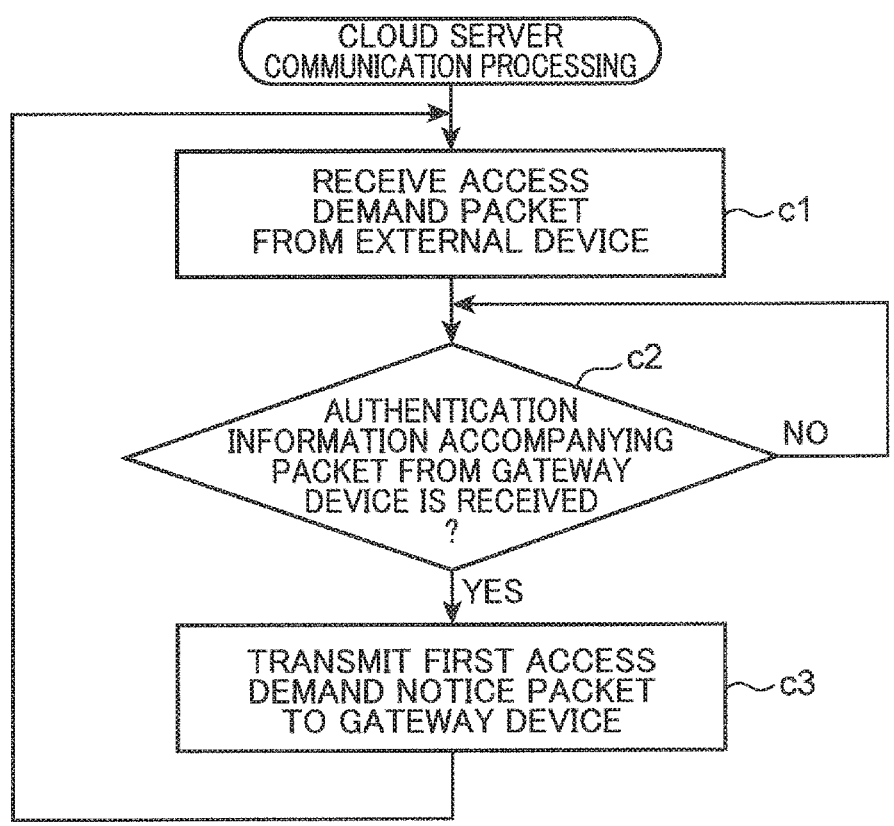
FIG. 14 is a flowchart showing a cloud server communication processing executed by the cloud server device in the communication network system according to the second embodiment.

Next, a communication processing by means of packet communication between the cloud server device 4 and the gateway device 9A for establishment of a session between the external device 3 and each of the first and second internal devices 61, 62 in the communication network system 1A will be described with reference to flowcharts shown in FIGS. 14 and 15. FIG. 14 is a flowchart showing a cloud server communication processing executed by the cloud server device 4 in the communication network system 1A. FIG. 15 is a flowchart showing a gateway communication processing executed by the gateway device 9A in the communication network system 1A.

As described above, in the communication network system 1A according to this embodiment, the cloud server device 4 is communicatively connectable with the external device 3 via the GN 2, and the gateway device 9A is communicative with the cloud server device 4 via the GN 2 owing to the first communication section 91 and further communicative with the first and second internal devices 61, 62 via the LAN 6 owing to the second communication section 92. The external device 3 connected with the GN 2 and each of the first and second internal devices 61, 62 connected with the LAN 6 defines therebetween a communication path including a communication path section which the cloud server device 4 builds up to reach the external device 3 via the GN 2, and another communication path section which the gateway device 9A relays between the GN 2 and the LAN 6.

(Cloud Server Communication Processing of Cloud Server Device)

The cloud server device 4 executes a cloud server communication processing by means of packet communication to establish a session between the external device 3 and each of the first and second internal devices 61, 62. First, the cloud server device 4 receives an access demand packet DP from the external device 3 via the GN 2 (step c1). Subsequently, the cloud server device 4 determines whether or not the cloud server device 4 receives an authentication information accompanying packet RP1A from the first communication section 91 of the gateway device 9A (step c2). The cloud server device 4 waits until receiving the authentication information accompanying packet RP1A from the first communication section 91 of the gateway device 9A. Upon receiving the authentication information accompanying packet RP1A, the cloud server device 4 specifies the global IP address GAG of the gateway device 9A, and specifies the authentication information JH2 for use in the authentication processing of the proxy server 10, with reference to the header information HJ6 of the authentication information accompanying packet RP1A. The cloud server device 4 then transmits a first access demand notice packet NP1 to the gateway device 9A in response to the authentication information accompanying packet RP1A (step c3). The cloud server device 4 returns to the step s1 in the flow after the transmission of the first access demand notice packet NP1 is completed, and repeats the sequence of the steps c1 to c3.

(Gateway Communication Processing of Gateway Device)

The gateway device 9A executes a gateway communication processing by means of packet communication to establish a session between the external device 3 and each of the first and second internal devices 61, 62. As shown in FIG. 15, the first communication controlling section 951 in the gateway device 9A causes the first communication section 91 to transmit an authentication information accompanying packet RP1A to the cloud server device 4 (step d1).

It should be noted here that header information HJ6 of the authentication information accompanying packet RP1A accompanies the authentication information JH2 for use in the authentication processing of the proxy server 10, the authentication information being stored in the authentication information storage section 98 of the gateway device 9A.

The gateway device 9A including the authentication information storage section 98 builds up a communication path section relaying between the GN 2 and the LAN 6 on the communication path between the external device 3 and the first and second internal devices 61, 62. This configuration eliminates the necessity of storing the authentication information for the first and second internal devices 61, 62 connected with the LAN 6. Moreover, the first communication controlling section 951 in the gateway device 9A including the authentication information storage section 98 causes the first communication section 91 to transmit the authentication information accompanying packet RP1A to the cloud server device 4. When transmitting the first access demand notice packet NP1 to the gateway device 9A in response to the authentication information accompanying packet RP1A, the cloud server device 4 can specify the authentication information JH2 for use in the authentication processing of the proxy server 10 with reference to the header information HJ6 of the authentication information accompanying packet RP1A.

Next, the first communication controlling section 951 determines whether or not the first communication section 91 receives a first access demand notice packet NP1 from the cloud server device 4 (step d2). The first communication controlling section 951 waits until the first communication section 91 receives the first access demand notice packet NP1.

Upon receiving the first access demand notice packet NP1 by the first communication section 91, the access permission and prohibition processing section 99 performs a permission processing of permitting an access from the external device 3 to any specific one of the first and second internal devices 61, 62 or a prohibition processing of prohibiting the access (step d3) in accordance with a predetermined access criterion (step d3).

When the permission processing is performed by the access permission and prohibition processing section 99 (step d4), the second communication controlling section 952 in the gateway device 9A determines whether or not the second communication section 92 receives a second periodic packet RP2 from the one of the first and second internal devices 61, 62 (step d5). The second communication controlling section 952 waits until the second communication section 92 receives the second periodic packet RP2.

Conversely, when the prohibition processing is performed by the access permission and prohibition processing section 99 (step d14), the second communication controlling section 952 in the gateway device 9A establishes no session between the external device 3 and the one of the second internal devices 61, 62 (step d15). In this case, the second communication controlling section 952 causes the second communication section 92 not to transmit a second access demand notice packet NP2 to the second internal devices 61, 62.

Upon receiving the first access demand notice packet NP1 by the first communication section 91 and receiving the second periodic packet RP2 by the second communication section 92, the second communication controlling section 952 causes the second communication section 92 to transmit a second access demand notice packet NP2 to the one of the first and second internal devices 61, 62 (step d6). The second communication controlling section 952 causes the second communication section 92 to transmit the second access demand notice packet NP2 to the one of the first and second internal devices 61, 62 to establish a session for mutual communication between the external device 3 and the one of the first and second internal devices 61, 62 (step d7).

As aforementioned, the second communication controlling section 952 should not be limited to the configuration in which the second communication controlling section 952 refers to the second periodic packet RP2 to establish a session for mutual communication between the external device 3 and any one of the first and second internal devices 61, 62. Instead, the second communication controlling section 952 may be configured to refer to the local communication information stored in the communication information storage section 97. In this configuration, the step d5 is omitted from the flowchart shown in FIG. 15. The second communication controlling section 952 causes, upon receiving the first access demand notice packet NP1 by the first communication section 91, the second communication section 92 to transmit the second access demand notice packet NP2 to the one of the first and second internal devices 61, 62 with reference to the local communication information stored in the communication information storage section 97 in the step d6.

After the establishment of the session between the external device 3 and the one of the first and second internal devices 61, 62, the communication history storage section 96 stores communication history information JH1 about a history of the mutual communication between the external device 3 and the one of the first and second internal devices 61, 62 (step d8).

The gateway device 9A including the communication history storage section 96 constitutes a part of the local system 5 belonging to the LAN 6 independent from GN 2, and is communicative with the first and second internal devices 61, 62 via the LAN6 owing to the second communication section 92. This configuration makes it possible to perform, in the LAN 6 built in the local system 5, monitoring as to whether or not an impermissible access to each of the first and second internal devices 61, 62 is executed by the external device 3 with reference to the communication history information JH1 stored in the communication history storage section 96 of the gateway device 9.

Further, the session monitoring section 931 in the gateway device 9A monitors a session between the external device 3 and each of the first and second internal devices 61, 62 (step d9). The session monitoring section 931 determines by monitoring the session whether or not an impermissible access to any one of the first and second internal devices 61, 62 is executed by the external device 3 (step d10). When the session monitoring section 931 detects no impermissible access, the communication administrator 93 determines whether or not the session between the external device 3 and the one of the first and second internal devices 61, 62 finishes (step d11), and further executes a session finishing processing of finishing the session (step d12).

Conversely, when the session monitoring section 931 detects an impermissible access and outputs impermissible access information, the impermissible access processing section 932 performs at least one of impermissible access processings, that is, one of a warning processing of notifying the impermissible access detection information and a disconnecting processing of disconnecting the communication between the external device 3 and the one of the first and second internal devices 61, 62 (step d13).

From these aspects, in the case that an impermissible access to any one of the first and second internal devices 61, 62 is executed by the external device 3, the session monitoring section 931 detects the impermissible access, and the impermissible access processing section 932 performs the warning processing and/or the disconnecting processing of the communication. The gateway device 9A including the session monitoring section 931 and the impermissible access processing section 932 constitutes a part of the local system 5 belonging to the LAN 6 independent from the GN 2 to be communicative with the first and second internal devices 61, 62 via the LAN 6 owing to the second communication section 92. Consequently, it is possible to perform, in the LAN 6 built in the local system 5, the monitoring as to whether or not an impermissible access to each of the first and the second internal devices 61, 62 is executed by the external device 3.

The above described embodiments mainly cover the disclosures having the following configurations.

A communication network system according to one aspect of the present disclosure includes an external device connected with a global network; an internal device connected with a local area network independent from the global network; a server device communicatively connectable with the external device via the global network; and a gateway device which relays communication between the global network and the local area network. The server device is configured to receive from the external device an access demand packet indicating a demand for an access to the internal device, and transmit a first access demand notice packet notifying receipt of the access demand packet to the gateway device, via the global network. The gateway device includes a first communication section which communicates with the server device via the global network; a second communication section which communicates with the internal device via the local area network; a first communication controlling section which controls the first communication section to cause the first communication section to receive the first access demand notice packet transmitted from the server device to the gateway device; a second communication controlling section which controls, upon receiving the first access demand notice packet by the first communication section, the second communication section to cause the second communication section to transmit a second access demand notice packet notifying the receipt of the first access demand notice packet to the internal device to establish a session between the external device and the internal device; and a communication history storage section which stores communication history information about a history of communication between the external device and the internal device after the establishment of the session.

In the communication network system, the server device is communicatively connectable with the external device via the global network, and the gateway device is communicative with the server device via the global network owing to the first communication section and further communicative with the internal device via the local area network owing to the second communication section. The external device connected with the global network and the internal device connected with the local area network define therebetween a communication path including a communication path section which the server device builds up to reach the external device via the global network, and another communication path section which the gateway device relays between the global network and the local area network. A session between the external device and the internal device is established in a sequence that the server device which has received the access demand packet from the external device transmits the first access demand notice packet to the gateway device, and the gateway device which has received the first access demand notice packet transmits the second access demand notice packet to the internal device.

The communication target of the external device via the global network is the server device. Hence, regarding a global IP address to be used for the communication via the global network, it is sufficient to disclose the corresponding address of the server device to the external device without disclosing the address of the gateway device. In this manner, a direct access from the external device to the internal device via the gateway device can be restricted. As a result, this configuration makes it possible to reliably prevent any impermissible access leading to outward information leakage among accesses from the external device to the internal device, thereby ensuring an advanced safety from the perspective of security.

Further, in the mutual communication between the external device and the internal device after the establishment of the session, the communication history information about the history of the communication is stored in the communication history storage section of the gateway device. The gateway device including the communication history storage section is communicative with the internal device via the local area network owing to the second communication section. In this way, it is possible to perform in the local area network monitoring as to whether or not an impermissible access to the internal device is executed by the external device with reference to the communication history information stored in the communication history storage section of the gateway device.

In the communication network system, the gateway device may include a session monitoring section which monitors the session between the external device and the internal device with reference to the communication history information stored in the communication history storage section, and outputs impermissible access detection information when detecting an impermissible access from the external device to the internal device; and an impermissible access processing section which performs at least one of a warning processing of notifying the impermissible access detection information and a disconnecting processing of disconnecting the communication between the external device and the internal device, when the session monitoring section outputs the impermissible access detection information.

With this configuration, if an impermissible access to the internal device is executed by the external device, the session monitoring section detects the impermissible access with reference to the communication history information stored in the communication history storage section, and the impermissible access processing section performs the warning processing and/or the communication disconnecting processing. In this manner, an advanced safety from the perspective of security is ensured.

In the communication network system, the gateway device may further include a session monitoring section which monitors the session between the external device and the internal device without reference to the communication history information stored in the communication history storage section, and outputs impermissible access detection information when detecting an impermissible access from the external device to the internal device; and an impermissible access processing section which performs at least one of a warning processing of notifying the impermissible access detection information and a disconnecting processing of disconnecting the communication between the external device and the internal device, when the session monitoring section outputs the impermissible access detection information.

With this configuration, if an impermissible access to the internal device is executed by the external device, the session monitoring section detects the impermissible access without reference to the communication history information stored in the communication history storage section, and the impermissible access processing section performs the warning processing and/or the communication disconnection processing. The gateway device including the session monitoring section and the impermissible access processing section is communicative with the internal device via the local area network owing to the second communication section. Consequently, it is possible to perform in the local area network the monitoring as to whether or not an impermissible access to the internal device is executed by the external device.

In the communication network system, the first communication controlling section causes the first communication section to periodically transmit a first periodic packet to the server device at a predetermined time interval, and causes the first communication section to receive the first access demand notice packet transmitted from the server device to the gateway device in response to the first periodic transmit packet. The second communication controlling section causes the second communication section to receive a second periodic packet periodically transmitted from the internal device to the gateway device at a predetermined time interval, and causes the second communication section to transmit the second access demand notice packet to the internal device in response to the second periodic packet.

In the communication network system, the gateway device may further include a communication information storage section which stores local communication information associating an address and an identifier of the internal device with each other, the address and the identifier being used for communication with the internal device via the local area network. The first communication controlling section causes the first communication section to periodically transmit a first periodic packet to the server device at a predetermined time interval, and causes the first communication section to receive the first access demand notice packet transmitted from the server device to the gateway device in response to the first periodic packet. The second communication controlling section causes, upon receiving the first access demand notice packet by the first communication section, the second communication section to transmit the second access demand notice packet to the internal device with reference to the local communication information stored in the communication information storage section.

The communication network system may further include a proxy server which performs an authentication processing of authenticating communication between the server device and the gateway device by the first communication section via the global network. The gateway device further includes an authentication information storage section which stores authentication information for use in the authentication processing of the proxy server. The first communication controlling section causes the first communication section to transmit an authentication information accompanying packet containing header information accompanying the authentication information to the server device as the first periodic packet; and the first communication section to receive the first access demand notice packet when the server device transmits the first access demand notice packet to the gateway device in response to the authentication information accompanying packet.

With this configuration, the authentication information for use in the authentication processing of the proxy server is stored in the authentication information storage section of the gateway device. The gateway device including the authentication information storage section builds up a communication path section relaying between the global network and the local area network on a communication path between the external device and the internal device. This configuration eliminates the necessity of storing the authentication information for the internal device connected with the local area network. Moreover, the first communication controlling section in the gateway device including the authentication information storage section causes the first communication section to transmit the authentication information accompanying packet to the server device. When transmitting the first access demand notice packet to the gateway device in response to the authentication information accompanying packet, the server device can specify the authentication information for use in the authentication processing of the proxy server with reference to the header information of the authentication information accompanying packet.

In the communication network system, the gateway device may include an access permission and prohibition processing section which performs a permission processing of permitting an access from the external device to the internal device or a prohibition processing of prohibiting the access from the external device to the internal device in accordance with a predetermined access criterion when the first communication section receives the first access demand notice packet under the control of the first communication controlling section. The second communication controlling section causes the second communication section to transmit the second access demand notice packet to the internal device to establish the session between the external device and the internal device when the permission processing is performed by the access permission and prohibition processing section; and the second communication section not to transmit the second access demand notice packet to the internal device to establish no session between the external device and the internal device when the prohibition processing is performed by the permission and prohibition processing section.

With this configuration, the gateway device which builds up the communication path relaying between the global network and the local area network includes the access permission and prohibition processing section. Further, the second communication controlling section in the gateway device causes the second communication section to transmit the second access demand notice packet to establish a session between the external device and the internal device when the permission processing is performed by the access permission and prohibition processing section. Conversely, the second communication controlling section causes the second communication section not to transmit the second access demand notice packet to establish no session between the external device and the internal device when the prohibition processing is performed by the access permission and prohibition processing section.

Conclusively, the present disclosure makes it possible to provide a communication network system which can perform in a local area network monitoring as to whether or not an impermissible access to an internal device connected with the local area network is executed by an external device connected with a global network.

What is claimed is:

1. A communication network system, comprising:
   an external device connected with a global network;
   an internal device connected with a local area network independent from the global network;
   a server communicatively connectable with the external device via the global network; and
   a gateway configured to relay communication between the global network and the local area network, wherein
   the server is configured to receive from the external device an access demand packet indicating a demand for an access to the internal device, and transmit a first access demand notice packet notifying receipt of the access demand packet to the gateway, via the global network, and
   the gateway includes:
      a first communication interface configured to communicate with the server via the global network;
      a second communication interface configured to communicate with the internal device via the local area network;
      a first communication controller configured to control the first communication interface to cause the first communication interface to receive the first access demand notice packet transmitted from the server to the gateway;
      a second communication controller configured to control, upon receiving the first access demand notice packet by the first communication interface, the second communication interface to cause the second communication interface to transmit a second access demand notice packet notifying the receipt of the first access demand notice packet to the internal device to establish a session between the external device and the internal device; and
      a communication history storage configured to store communication history information about a history of communication between the external device and the internal device after the establishment of the session, and
   wherein the gateway further includes:
      a session monitor configured to monitor the session between the external device and the internal device with reference to the communication history information stored in the communication history storage, and output impermissible access detection information when detecting an impermissible access from the external device to the internal device; and
      an impermissible access processor configured to perform at least one of a warning processing of notifying the impermissible access detection information and a disconnecting processing of disconnecting the communication between the external device and the internal device, when the session monitor outputs the impermissible access detection information.

2. A communication network system according to claim 1, wherein
   the first communication controller is configured to cause the first communication interface to periodically transmit a first periodic packet to the server at a predetermined time interval, and cause the first communication interface to receive the first access demand notice packet transmitted from the server to the gateway in response to the first periodic transmit packet, and
   the second communication controller is configured to cause the second communication interface to receive a second periodic packet periodically transmitted from the internal device to the gateway at a predetermined time interval, and cause the second communication interface to transmit the second access demand notice packet to the internal device in response to the second periodic packet.

3. A communication network system according to claim 2, further comprising:
   a proxy server configured to perform an authentication processing of authenticating communication between the server and the gateway by the first communication interface via the global network, wherein
   the gateway further includes an authentication information storage configured to store authentication information for use in the authentication processing of the proxy server, and
   the first communication controlling interface is configured to cause:
      the first communication interface to transmit an authentication information accompanying packet containing header information accompanying the authentication information to the server as the first periodic packet; and
      the first communication interface to receive the first access demand notice packet when the server transmits the first access demand notice packet to the gateway in response to the authentication information accompanying packet.

4. A communication network system according to claim 1, wherein
the gateway further includes a communication information storage configured to store local communication information associating an address and an identifier of the internal device with each other, the address and the identifier being used for communication with the internal device via the local area network,
the first communication controller is configured to cause the first communication interface to periodically transmit a first periodic packet to the server at a predetermined time interval, and cause the first communication interface to receive the first access demand notice packet transmitted from the server to the gateway in response to the first periodic packet, and
the second communication controller is configured to cause, upon receiving the first access demand notice packet by the first communication interface, the second communication interface to transmit the second access demand notice packet to the internal device with reference to the local communication information stored in the communication information storage.

5. A communication network system according to claim 4, further comprising:
a proxy server configured to perform an authentication processing of authenticating communication between the server and the gateway by the first communication interface via the global network, wherein
the gateway further includes an authentication information storage configured to store authentication information for use in the authentication processing of the proxy server, and
the first communication controller is configured to cause:
the first communication interface to transmit an authentication information accompanying packet containing header information accompanying the authentication information to the server as the first periodic packet; and
the first communication interface to receive the first access demand notice packet when the server transmits the first access demand notice packet to the gateway in response to the authentication information accompanying packet.

6. A communication network system, comprising:
an external device connected with a global network;
an internal device connected with a local area network independent from the global network;
a server communicatively connectable with the external device via the global network; and
a gateway configured to relay communication between the global network and the local area network, wherein
the server is configured to receive from the external device an access demand packet indicating a demand for an access to the internal device, and transmit a first access demand notice packet notifying receipt of the access demand packet to the gateway, via the global network, and
the gateway includes:
a first communication interface configured to communicate with the server via the global network;
a second communication interface configured to communicate with the internal device via the local area network;
a first communication controller configured to control the first communication interface to cause the first communication interface to receive the first access demand notice packet transmitted from the server to the gateway;
a second communication controller configured to control, upon receiving the first access demand notice packet by the first communication interface, the second communication interface to cause the second communication interface to transmit a second access demand notice packet notifying the receipt of the first access demand notice packet to the internal device to establish a session between the external device and the internal device; and
a communication history storage configured to store communication history information about a history of communication between the external device and the internal device after the establishment of the session, and
wherein the gateway further includes:
a session monitor configured to monitor the session between the external device and the internal device without reference to the communication history information stored in the communication history storage, and output impermissible access detection information when detecting an impermissible access from the external device to the internal device; and
an impermissible access processor configured to perform at least one of a warning processing of notifying the impermissible access detection information and a disconnecting processing of disconnecting the communication between the external device and the internal device, when the session monitor outputs the impermissible access detection information.

7. A communication network system according to claim 6, wherein
the first communication controller is configured to cause the first communication interface to periodically transmit a first periodic packet to the server at a predetermined time interval, and causes the first communication interface to receive the first access demand notice packet transmitted from the server to the gateway in response to the first periodic transmit packet, and
the second communication controller is configured to cause the second communication interface to receive a second periodic packet periodically transmitted from the internal device to the gateway at a predetermined time interval, and causes the second communication interface to transmit the second access demand notice packet to the internal device in response to the second periodic packet.

8. A communication network system according to claim 7, further comprising:
a proxy server configured to perform an authentication processing of authenticating communication between the server and the gateway by the first communication interface via the global network, wherein
the gateway further includes an authentication information storage configured to store authentication information for use in the authentication processing of the proxy server, and
the first communication controller is configured to cause:
the first communication interface to transmit an authentication information accompanying packet containing header information accompanying the authentication information to the server as the first periodic packet; and
the first communication interface to receive the first access demand notice packet when the server transmits the first access demand notice packet to the gateway in response to the authentication information accompanying packet.

9. A communication network system according to claim 6, wherein the gateway further includes a communication information storage configured to store local communication information associating an address and an identifier of the internal device with each other, the address and the identifier being used for communication with the internal device via the local area network, the first communication controller is configured to cause the first communication interface to periodically transmit a first periodic packet to the server at a predetermined time interval, and causes the first communication interface to receive the first access demand notice packet transmitted from the server to the gateway in response to the first periodic packet, and the second communication controller is configured to cause, upon receiving the first access demand notice packet by the first communication interface, the second communication interface to transmit the second access demand notice packet to the internal device with reference to the local communication information stored in the communication information storage.

10. A communication network system according to claim 9, further comprising:

a proxy server configured to perform an authentication processing of authenticating communication between the server and the gateway by the first communication interface via the global network, wherein the gateway further includes an authentication information storage configured to store authentication information for use in the authentication processing of the proxy server, and the first communication controller is configured to cause:
the first communication interface to transmit an authentication information accompanying packet containing header information accompanying the authentication information to the server as the first periodic packet; and
the first communication interface to receive the first access demand notice packet when the server transmits the first access demand notice packet to the gateway in response to the authentication information accompanying packet.

11. A communication network system, comprising:
an external device connected with a global network;
an internal device connected with a local area network independent from the global network;
a server communicatively connectable with the external device via the global network; and
a gateway configured to relay communication between the global network and the local area network, wherein
the server is configured to receive from the external device an access demand packet indicating a demand for an access to the internal device, and transmit a first access demand notice packet notifying receipt of the access demand packet to the gateway, via the global network, and
the gateway includes:
a first communication interface configured to communicate with the server via the global network;
a second communication interface configured to communicate with the internal device via the local area network;
a first communication controller configured to control the first communication interface to cause the first communication interface to receive the first access demand notice packet transmitted from the server to the gateway;
a second communication controller configured to control, upon receiving the first access demand notice packet by the first communication interface, the second communication interface to cause the second communication interface to transmit a second access demand notice packet notifying the receipt of the first access demand notice packet to the internal device to establish a session between the external device and the internal device; and
a communication history storage configured to store communication history information about a history of communication between the external device and the internal device after the establishment of the session,
the first communication controller is configured to cause the first communication interface to periodically transmit a first periodic packet to the server at a predetermined time interval, and causing the first communication interface to receive the first access demand notice packet transmitted from the server to the gateway in response to the first periodic transmit packet.

12. A communication network system according to claim 11, wherein
the second communication controller is configured to cause the second communication interface to receive a second periodic packet periodically transmitted from the internal device to the gateway at a predetermined time interval, and cause the second communication interface to transmit the second access demand notice packet to the internal device in response to the second periodic packet.

13. A communication network system according to claim 12, further comprising:
a proxy server configured to perform an authentication processing of authenticating communication between the server and the gateway by the first communication interface via the global network, wherein
the gateway further includes an authentication information storage configured to store authentication information for use in the authentication processing of the proxy server, and
the first communication controller is configured to cause:
the first communication interface to transmit an authentication information accompanying packet containing header information accompanying the authentication information to the server as the first periodic packet; and
the first communication interface to receive the first access demand notice packet when the server transmits the first access demand notice packet to the gateway in response to the authentication information accompanying packet.

14. A communication network system according to claim 13, wherein
the gateway further includes an access permission and prohibition processor configured to perform a permission processing of permitting an access from the external device to the internal device or a prohibition processing of prohibiting the access from the external device to the internal device in accordance with a predetermined access criterion when the first communication interface receives the first access demand notice packet under the control of the first communication controller, and the second communication controller is configured to cause:

the second communication interface to transmit the second access demand notice packet to the internal device to establish the session between the external device and the internal device when the permission processing is performed by the access permission and prohibition processor; and the second communication interface not to transmit the second access demand notice packet to the internal device to establish no session between the external device and the internal device when the prohibition processing is performed by the permission and prohibition processor.

15. A communication network system according to claim 11, wherein the gateway further includes a communication information storage configured to store local communication information associating an address and an identifier of the internal device with each other, the address and the identifier being used for communication with the internal device via the local area network, the second communication controller is configured to cause, upon receiving the first access demand notice packet by the first communication interface, the second communication interface to transmit the second access demand notice packet to the internal device with reference to the local communication information stored in the communication information storage.

* * * * *